United States Patent [19]
Ciokajlo et al.

[11] Patent Number: 5,272,868
[45] Date of Patent: Dec. 28, 1993

[54] GAS TURBINE ENGINE LUBRICATION SYSTEM

[75] Inventors: John J. Ciokajlo, Henderson, Nev.; Ambrose A. Hauser, Wyoming; Samuel H. Davison, Milford, both of Ohio

[73] Assignee: General Electric Company, Cincinnati, Ohio

[21] Appl. No.: 43,073

[22] Filed: Apr. 5, 1993

[51] Int. Cl.$^5$ ............................................. F02C 7/06
[52] U.S. Cl. ................................. 60/39.08; 184/6.11
[58] Field of Search ............... 60/39.08, 39.162, 268; 184/6.11

[56] References Cited

U.S. PATENT DOCUMENTS

| | | | |
|---|---|---|---|
| 3,861,139 | 1/1975 | Jones | 60/268 |
| 4,265,334 | 5/1981 | Benhase, Jr. | 60/39.08 |
| 4,378,197 | 3/1983 | Cattaneo et al. | 60/39.08 |
| 4,767,271 | 8/1988 | Catlow | 416/129 |
| 4,790,133 | 12/1988 | Stuart | 60/226.1 |
| 4,860,537 | 8/1989 | Taylor | 60/226.1 |
| 5,079,916 | 1/1992 | Johnson | 60/268 |

FOREIGN PATENT DOCUMENTS

| | | | |
|---|---|---|---|
| 0208629 | 8/1988 | Japan | 184/6.11 |
| 0876862 | 9/1961 | United Kingdom | 184/6.11 |

Primary Examiner—Richard E. Gluck
Assistant Examiner—William J. Wicker
Attorney, Agent, or Firm—Jerome C. Squillaro

[57] ABSTRACT

A lubrication system for a gas turbine engine includes first and second coaxially rotor shafts having at least one differential bearing disposed in outer and inner seats thereof. An annular first scoop extends axially from a first portion of the first shaft, and an annular second scoop extends axially from the inner seat of the second shaft. A plurality of first holes extend axially through the first shaft and radially below the first scoop, and a plurality of second holes extend axially through the inner seat of the second shaft and below the second scoop. An annular first shell extends axially between the second scoop and the first shaft from above the first holes. And, oil is injected under the first scoop for flow by centrifugal force from rotation of the first shaft through the first holes and along the first shell into the second scoop for flow through the second holes to lubricate the bearing.

9 Claims, 4 Drawing Sheets

GAS TURBINE ENGINE LUBRICATION SYSTEM

The present invention relates generally to gas turbine engines, and, more specifically, to a lubrication system therein.

BACKGROUND OF THE INVENTION

In one type of gas turbine engine, forward and aft fans are joined to respective drum rotors of a counter-rotating power turbine for being powered thereby. A first rotor shaft joins the outer drum to the aft fan, and a second rotor shaft joins the inner drum to the forward fan and extends concentrically inside the first shaft. The first and second shafts are suitably supported by bearings to stationary frames in the engine.

Conventional bearings typically are provided with lubrication oil through oil injectors located adjacent thereto. However, since the second shaft is disposed inside the first shaft and rotates in an opposite direction, the required bearings therebetween are not readily accessible for supplying lubrication oil thereto.

SUMMARY OF THE INVENTION

A lubrication system for a gas turbine engine includes first and second coaxial rotor shafts having at least one differential bearing disposed in outer and inner seats thereof. An annular first scoop extends axially from a first portion of the first shaft, and an annular second scoop extends axially from the inner seat of the second shaft. A plurality of first holes extend axially through the first shaft and radially below the first scoop, and a plurality of second holes extend axially through the inner seat of the second shaft and below the second scoop. An annular first shell extends axially between the second scoop and the first shaft from above the first holes. And, oil is injected under the first scoop for flow by centrifugal force from rotation of the first shaft through the first holes and along the first shell into the second scoop for flow through the second holes to lubricate the bearing.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
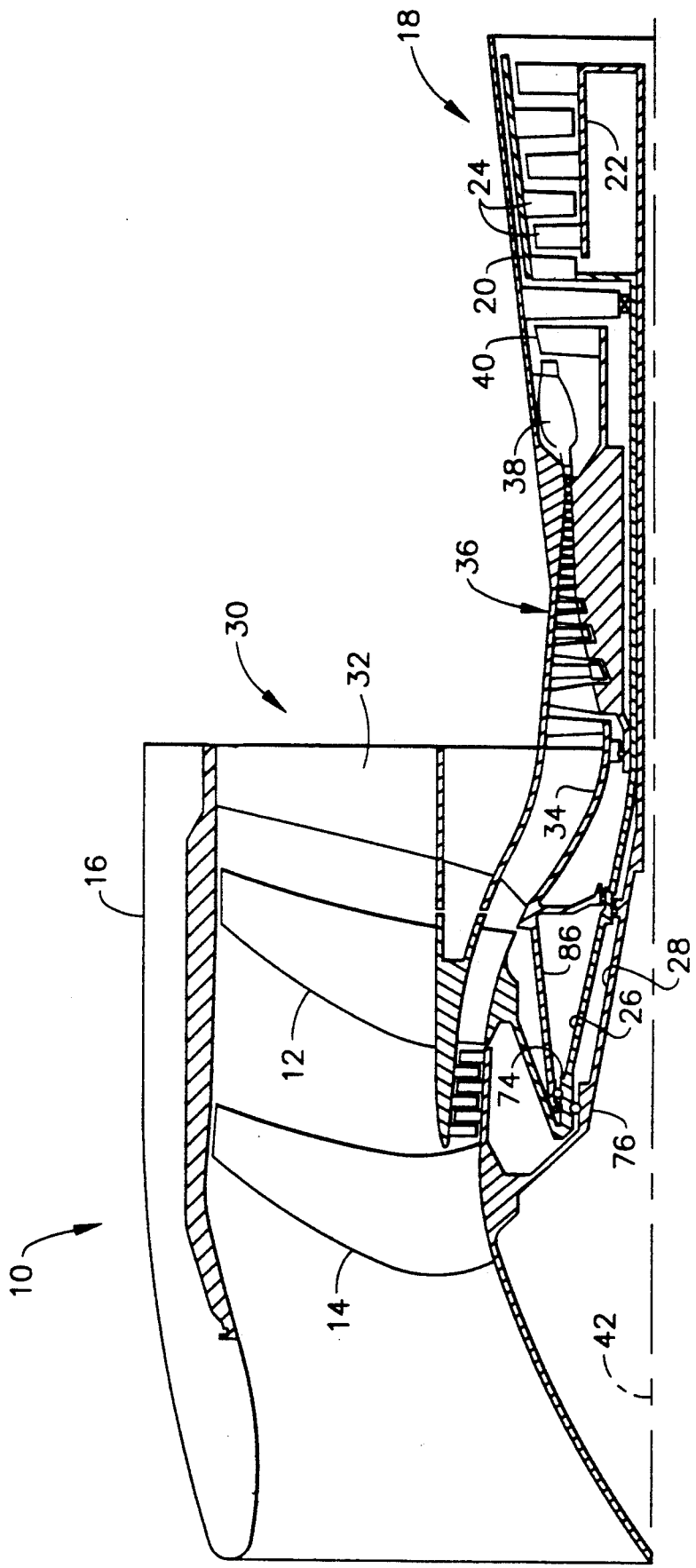
FIG. 1 is a schematic, longitudinal sectional view of the upper half of an exemplary gas turbine engine having counter-rotating fans powered by a counter-rotating power turbine through first and second coaxial shafts having differential bearings therebetween lubricated in accordance with one embodiment of the present invention.

Illustrated schematically in FIG. 1 is an exemplary high bypass, subsonic turbofan engine 10 configured for powering an aircraft in flight. The engine 10 includes a pair of aft and forward conventional fans 12, 14 each including a plurality of circumferentially spaced apart fan blades disposed within a conventional annular nacelle 16. The engine 10 further includes a conventional counter-rotating power turbine 18 having an outer spool or drum 20 and a radially inner spool or drum 22 each of which includes a plurality of circumferentially spaced apart rotor blades 24 disposed in respective stages or rows from the outer and inner drums 20, 22. The outer drum 20 is conventionally joined to a first tubular rotor shaft 26 for rotating the first shaft 26 and the aft fan 12 in one direction, and the inner drum 22 is conventionally joined to a second tubular rotor shaft 28 for rotating the second shaft 28 and the forward fan 14 in an opposite direction.

Disposed downstream or aft of the aft fan 12 is a conventional annular fan frame 30 having a plurality of circumferentially spaced apart struts 32 joined at their radially inner ends to an annular radially inner hub 34. Disposed downstream from the fan frame 30 is a conventional gas generator including a high pressure compressor (HPC) 36, an annular combustor 38 which receives compressed air from the HPC 36 which is mixed with fuel and ignited for generating combustion gases which flow downstream therefrom into a conventional high pressure turbine (HPT) 40 which is operatively joined to the HPC 36. The HPT 40 extracts energy from the combustion gases to drive the HPC 36, with the combustion gases then flowing through the power turbine 18 which extracts further energy therefrom for powering both the aft and forward fans 12, 14.

The engine 10 includes various conventional bearings for supporting the several shafts thereof, which bearings must be suitably lubricated. However, since the second shaft 28 is disposed radially inside the first shaft 26 and coaxially therewith about a longitudinal or axial centerline axis 42, the radially outer first shaft 26 prevents direct access to the radially inner second shaft 28 and the bearings therebetween for providing lubrication oil thereto.

Figure 2:
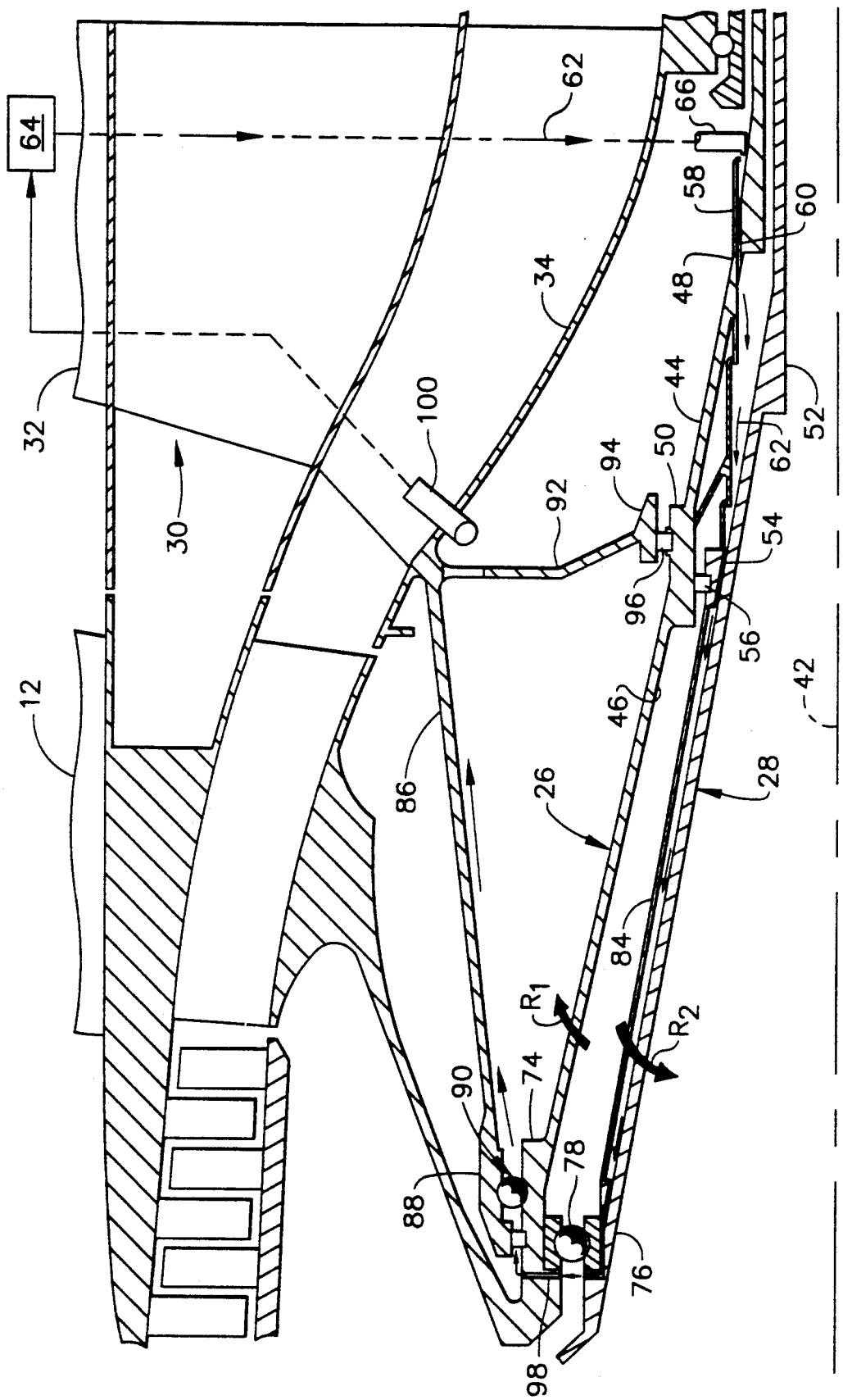
FIG. 2 is an enlarged, longitudinal sectional view of the fan portion of the engine illustrated in FIG. 1 showing in more particularity the first and second counter rotating fan shafts and supporting bearings therebetween, and a lubrication system in accordance with one embodiment of the present invention.

More specifically, FIG. 2 illustrates in more particularity the fan region of the engine illustrated in FIG. 1 and a lubrication system in accordance with one embodiment of the present invention for providing oil to bearings within the first shaft 26. The first shaft 26 includes a radially outer surface 44 and a radially inner surface 46 disposed coaxially about the centerline axis 42. The first shaft 26 extends axially from the aft fan 12 to the outer drum 20 and includes a first portion 48 disposed radially below the fan frame 30, and a conventional annular, first radially outer bearing seat 50 spaced axially forwardly from the first portion 48.

The second shaft 28 similarly extends from the forward fan 14 to the inner drum 22 coaxially about the centerline axis 42 and is spaced radially inwardly from the first shaft 26. The second shaft 28 also includes outer and inner surfaces and a first portion 52 disposed adjacent to the first portion 48 of the first shaft 26. The second shaft 28 further includes an annular, first radially inner bearing seat 54 aligned axially, i.e. at the same axial position, with the first outer seat 50. A conventional differential first bearing 56 is disposed in the first outer and inner seats 50, 54 and is conventionally fixedly joined thereto for supporting a portion of the second shaft 28 to the first shaft 26 and in turn to the fan frame 30 as described in more detail below.

Figure 4:
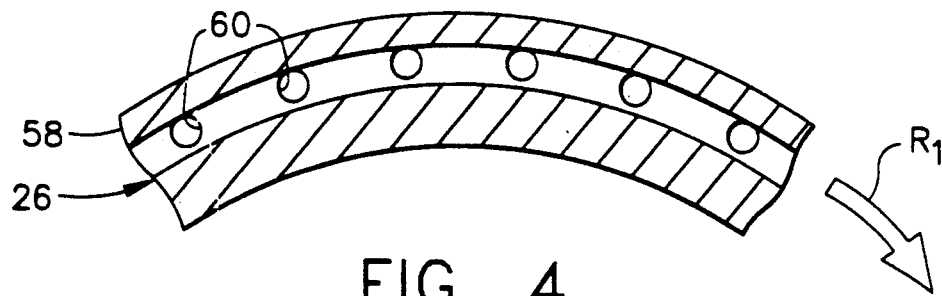
FIG. 4 is a partly sectional transverse view through the first shaft illustrated in FIG. 3 and taken along line 4—4.

An annular first scoop 58 extends axially from the outer surface 44 of the first shaft 26 at the first portion 48, and a plurality of circumferentially spaced apart first holes 60 extend axially through the first shaft 26 radially below the first scoop 58 and in flow communication therewith as additionally shown in FIG. 4.

Conventional means are provided for injecting oil 62 under the first scoop 58 for flow by centrifugal force from rotation of the first shaft 26 through the first holes 60 for lubricating, for example, the first bearing 56. The oil injecting means includes a conventional oil supply and pump 64 conventionally located in the engine 10 and being effective for channeling the oil 62 through a suitable conduit to a conventional oil injector 66 which injects the oil 62 under the first scoop 58.

Figure 3:
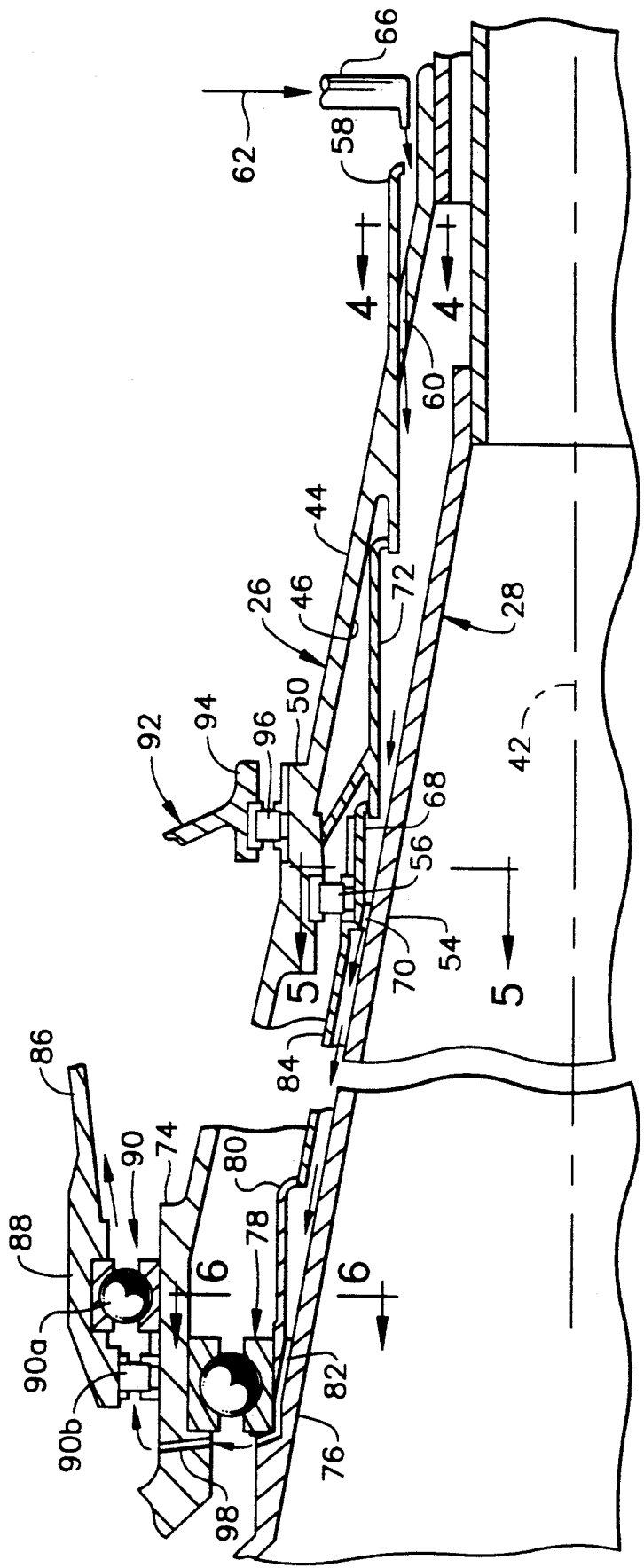
FIG. 3 is a an enlarged, partly sectional view of the lubrication system illustrated in FIG. 2.
Figure 5:
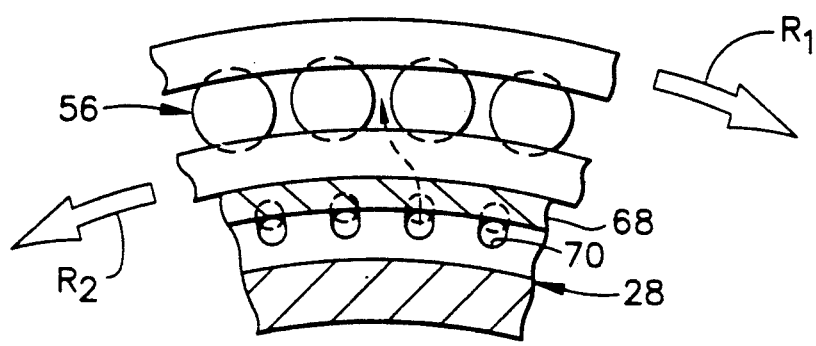
FIG. 5 is a partly sectional, transverse view of the second shaft illustrated in FIG. 3 and taken along line 5—5.

FIG. 3 illustrates in more particularity the lubrication system in accordance with this embodiment of the present invention. The system further includes an annular second scoop 68 extending integrally and axially aft from the first inner seat 54 of the second shaft 28. And, a plurality of circumferentially spaced apart second holes 70 extend axially through the first inner seat 54 along the outer surface of the second shaft 28 from radially below the second scoop 68 and in flow communication therewith as additionally shown in FIG. 5. In order to carry the oil 62 from the first scoop 58 to the second scoop 68, an annular or tubular first shell 72 is suitably fixedly joined to the first shaft 26 and extends axially between the second scoop 68 and the first shaft inner surface 46 from radially above the first holes 60 in flow communication therewith.

As illustrated in FIG. 3, the first scoop 58 is integral with the first shaft 26 and has a forward portion disposed in sliding contact with an aft portion of the first shell 72 for allowing differential movement therebetween. And, the forward portion of the first shell 72 is similarly axially slidably joined to the aft end of the second scoop 68 for accommodating differential movement therebetween. With this arrangement, the oil injector 66 injects the oil 62 under the first scoop 58 with the oil then flowing through the first holes 60 and along the inner surface of the first shell 72 from which it is received in the second scoop 68 and channeled into the second holes 70. In the exemplary embodiment illustrated in FIG. 3, the second holes 70 preferably extend completely axially through the first inner seat 54 along the outer surface of the second shaft 28 for providing a portion of the oil 62 for lubricating bearings at the forward end of the engine 10. However, the second holes 70 have radially extending branches which channel a portion of the oil 62 radially upwardly through the first inner seat 54 for lubricating the first bearing 56 in a conventional fashion. The first and second scoops 58 and 68, the shell 72, and the cooperating holes 60, 70 provide access through the first rotating shaft 26 in accordance with one embodiment of the present invention to channel the oil 62 to at least the first bearing 56 which is conventionally configured for being lubricated thereby.

In the preferred embodiment of the present invention, the first scoop 58, the second scoop 68, and the first shell 72 are in turn conical, i.e. having in turn increasing diameters in the aft-to-forward direction, for channeling the oil 62 from the first scoop 58 to the second scoop 68 along the first shell 72 by centrifugal force due to rotation of the first and second shaft 26, 28. In this way, the oil 62 is channeled axially through the first shaft 26 and across the space between the first and second shafts 26, 28 for feeding the inner race of the first bearing 56.

Furthermore, the oil 62 may also be carried further forwardly along the engine 10 to feed an additional bearing located also inside the first shaft 26. More specifically, and referring to FIG. 3, the first shaft 26 further includes an annular, second radially outer seat 74 spaced axially forwardly from the first outer seat 50, and the second shaft 28 correspondingly includes an annular, second radially inner seat 76 spaced axially forwardly from the first inner seat 54 and aligned axially with the second outer seat 74.

Figure 6:
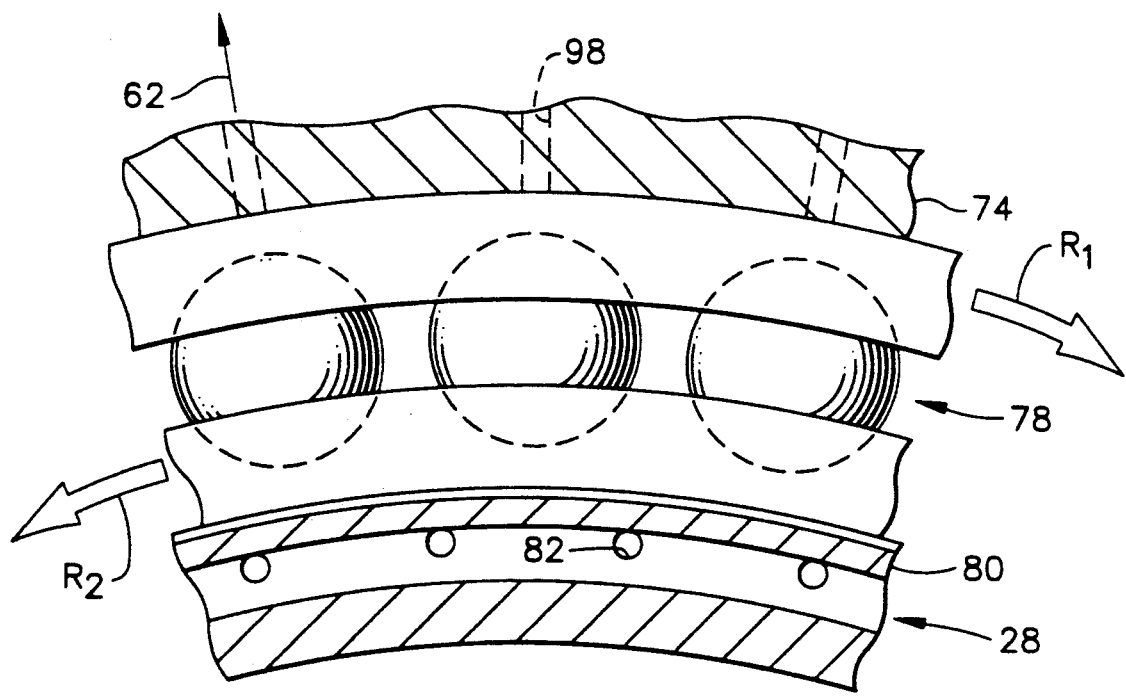
FIG. 6 is a partly sectional, transverse view of the first and second shafts illustrated in FIG. 3 and taken along line 6—6.

A conventional differential second ball bearing 78 is disposed in the second outer and inner seats 74, 76 and conventionally fixedly joined thereto. An annular third scoop 80 extends axially aft from the second inner seat 76 of the second shaft 28, and a plurality of circumferentially spaced apart third holes 82 extend axially and preferably completely through the second inner seat 76 from radially below the third scoop 80 and in flow communication therewith as additionally shown in FIG. 6.

An annular or tubular second shell 84 extends axially between the third scoop 80 and the first inner seat 54 from radially above the second holes 70 in flow communication therewith for channeling the oil 62 therefrom to the third scoop 80 to feed the third holes 82 and in turn the second bearing 78. The third scoop 80 and the second shell 84 are in turn conical or similarly have increasing diameters from the aft-to-forward direction for channeling the oil 62 from the second holes 70 to the third holes 82 along the second shell 84 by centrifugal force due to rotation of the second shaft 28. As shown most clearly in FIG. 1, the aft fan 12 is fixedly joined to the first shaft 26 at the second outer seat 74, and the forward fan 14 is fixedly joined to the second shaft 28 at the second inner seat 76. The aft and forward fans 12, 14 are conventionally configured for counter-rotation, with the respective blades thereof having opposite pitch, with the first and second shafts 26, 28 being counter-rotatable therewith, respectively, by the outer and inner drums 20, 22 of the power turbine 18. FIGS. 2, 4, 5, and 6 illustrate exemplary counter-rotation direction arrows labeled $R_1$ and $R_2$.

In order to support the forward end of the first and second shafts 26, 28, a conventional support cone 86 as shown in FIG. 2 is conventionally fixedly joined at a proximal end to the fan frame hub 34, and has an annular, third radially outer bearing seat 88 at a distal end thereof aligned generally axially with and disposed radially above the second outer seat 74 of the first shaft 26. As shown more clearly in FIG. 3, at least one forward support bearing 90 is disposed between the third outer seat 88 and the outside of the second outer seat 74 and conventionally fixedly joined thereto. In the embodiment illustrated in FIG. 3, the forward support bearing 90 includes a pair of conventional ball and roller bearings 90a, 90b for conventionally supporting thrust and radial loads, respectively, from the first shaft 26 to the support cone 86.

Again referring to FIG. 2, a conventional annular support flange 92 is conventionally fixedly joined at a proximal end to the fan frame hub 34, and includes an annular, fourth radially outer bearing seat 94 at a distal end thereof aligned generally axially with and disposed radially above the first outer seat 50. A conventional mid-support roller bearing 96 is disposed between the fourth outer seat 94 and the outside of the first outer seat 50 and is conventionally fixedly joined therewith. In this way, loads from the second shaft 28 through the first bearing 56 are carried through the first outer seat 50 and through the mid-support bearing 96 and in turn through the support flange 92 to the fan frame 30.

A plurality of circumferentially spaced apart fourth holes 98 extend radially through the second outer seat 74 for channeling the oil 62 to the forward support bearing 90 and in turn axially aft along the radially inside surface of the support cone 86 to the hub 34. The hub 34 includes a conventional oil sump 100 suitably joined in flow communication with the oil supply 64 for returning used oil thereto. The support cone 86 is inclined in the forward-to-aft direction with an increasing diameter outwardly from the third outer seat 88 to the hub 34 for channeling by gravity the oil to the sump 100 in the hub 34.

Accordingly, the lubrication system disclosed above provides an effective flowpath through the rotating first shaft 26 for channeling the lubrication oil 62 to the first bearing 56, or the second bearing 78, or both in the preferred embodiment illustrated by using centrifugal force from rotation of the first and second shafts 26 and 28. The used oil 62 is returned to the sump 100 along the inner surface of the support cone 86 and is then conventionally returned to the oil supply 64 wherein it is conventionally filtered and cooled and used again in the lubrication system.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A lubrication system for a gas turbine engine comprising:
   a first tubular rotor shaft including an outer surface and an inner surface disposed coaxially about a centerline axis, a first portion, and an outer seat spaced axially from said first portion;
   a second tubular rotor shaft disposed coaxially about said centerline axis and spaced radially inwardly from said first shaft and including a first portion disposed adjacent to said first shaft first portion, and an inner seat aligned axially with said first outer seat;
   a differential first bearing disposed in said first outer and inner seats;
   an annular first scoop extending axially from said first shaft outer surface at said first portion thereof;
   a plurality of circumferentially spaced apart first holes extending axially through said first shaft radially below said first scoop and in flow communication therewith;
   an annular second scoop extending axially from said first inner seat of said second shaft;
   a plurality of circumferentially spaced apart second holes extending axially through said first inner seat from radially below said second scoop and in flow communication therewith;
   a first shell extending axially between said second scoop in said first shaft inner surface from radially above said first holes in flow communication therewith; and
   means for injecting oil under said first scoop for flow by centrifugal force from rotation of said first shaft through said first holes and along said first shell into said second scoop for flow through said second holes to lubricate said first bearing.

2. A system according to claim 1 wherein said first scoop, said second scoop, and said first shell are in turn conical for channeling said oil from said first scoop to said second scoop by centrifugal force due to rotation of said first shaft.

3. A system according to claim 2 wherein:
   said second holes extend completely axially through said first inner seat;
   said first shaft further includes a second outer seat spaced axially from said first outer seat;
   said second shaft further includes a second inner seat spaced axially from said first inner seat and aligned axially with said second outer seat; and
   further comprising:
   a differential second bearing disposed in said second outer and inner seats;
   an annular third scoop extending axially from said second inner seat of said second shaft;
   a plurality of circumferentially spaced apart third holes extending axially through said second inner seat from radially below said third scoop and in flow communication therewith; and
   a second shell extending axially between said third scoop and said first inner seat from radially above said second holes in flow communication therewith for channeling said oil therefrom to said third scoop to feed said third holes.

4. A system according to claim 3 wherein said third scoop and said third shell are in turn conical for channeling said oil from said second holes to said third holes by centrifugal force due to rotation of said second shaft.

5. A system according to claim 4 further comprising:
   an aft fan fixedly joined to said first shaft at said second outer seat;
   a forward fan fixedly joined to said second shaft at said second inner seat; and
   said aft and forward fans being configured for counter-rotation, with said first and second shafts being counter-rotatable therewith, respectively.

6. A system according to claim 5 further comprising:
   a fan frame disposed axially aft of said aft fan and including an inner hub;
   a support cone fixedly joined at a proximal end to said fan frame, and having a third outer seat at a distal end thereof disposed radially above said second outer seat of said first shaft;
   at least one forward support bearing disposed between said third outer seat and said second outer seat;
   a support flange fixedly joined at a proximal end to said fan frame hub, and having a fourth outer seat at a distal end thereof disposed radially above said first outer seat;

a mid-support bearing disposed between said fourth outer seat and said first outer seat; and a plurality of circumferentially spaced apart fourth holes extending radially through said second outer seat for channeling said oil to said forward support bearing and in turn along said support cone to said hub.

7. A system according to claim 6 wherein said support cone is inclined outwardly from said third outer seat to said hub for channeling said oil to said hub.

8. A system according to claim 6 wherein said forward support bearing includes a pair of ball and roller bearings for supporting thrust and radial loads from said first shaft to said support cone.

9. A system according to claim 6 further comprising a counter-rotating power turbine having an outer drum joined to said first shaft for rotating said first shaft and said aft fan in one direction, and an inner drum joined to said second shaft for rotating said second shaft and said forward fan in an opposite direction.

* * * * *